United States Patent Office 3,647,686
Patented Mar. 7, 1972

3,647,686
METHOD OF TREATING INDUSTRIAL WASTE WATER WITHOUT CONTAMINATION OF THE ENVIRONMENT
Karl Einar Gunnarsson, Torshalla, Sweden, assignor to Nyby Bruks Aktiebolag, Nyby bruk, Sweden
No Drawing. Filed Oct. 16, 1970, Ser. No. 81,577
Int. Cl. C02c 5/02
U.S. Cl. 210—48         7 Claims

ABSTRACT OF THE DISCLOSURE

The invention consists in a mode of treating industrial waste water contaminated with metal ions, nitrate ions and fluoride ions which comprises the steps of converting the fluoride ions of the waste water to insoluble fluorides, neutralizing the waste water with an ammoniacal neutralizing agent and adding excess ammonia to a pH of at least 8, filtering, adding an alkali hydroxide to the filtrate, distilling off the content of ammonia and finally removing any solid phase from the distillation residue.

In the production of metallic semi-manufactured products and other industrial goods of iron or metal, the surface treatment, and particularly the pickling process, is one of the most important operations. At this treatment, the surface of the metallic object is subjected to a chemical attack, which in many cases is an electro-chemical attack, in order to remove the reaction products originating, for example, from annealing or working operations. Pickling baths of this type usually consist of mixtures of inorganic acids, such as $HNO_3$, $H_2SO_4$, HCl, $H_3PO_4$, HF and water.

The reaction products originating from the surface treatment are metal ions and metallic oxides, which latter are insoluble and form a mud. When the acid concentration of the pickling bath, and thereby its efficiency, decreases, a new pickling solution usually is added. Such additions are made until the contamination has reached a degree so high that the pickling bath must be exchanged in its entirety. In most of the industrial countries it is not permitted to discharge such pickling baths through the waste outlet, i.e. into the environment, and therefore so-called neutralization processes have been introduced. These processes usually comprise the steps of adding chemicals, preferably and advantageously lime (calcium hydroxide), to the pickling bath solutions, whereby the metal ions are precipitated as hydroxides difficult to dissolve, and the negative ions of the acids are converted to more or less soluble lime salts, which are directed to the waste outlet or are stored in waste heaps, a method which hitherto has not been deemed detrimental.

The latest results in environmental research, however, have proved that such waste water must be regarded to involve a serious pollution of our lakes and rivers, and that the storage in waste heaps of the aforesaid products difficult to dissolve is not tolerable any longer from a protection of nature point of view.

The present invention shows a new way for the treatment of such waste water. The method according to the invention meets the new requirements with respect to the protection of nature and environment and is substantially characterized in that impurities are prevented from entering the atmosphere and lakes and rivers as well as the soil. This is achieved in that the worn-out pickling solutions are converted to a form allowing for their industrial re-use. The method according to the invention comprises the feature of utilizing chemical reactions, each of which is known per se, in a combination which heretofore has been unknown and not been applied. This combination sequence of method steps for satisfying the aforesaid protection of nature requirement involves an apparent merit of invention. A further feature of patentable merit, constituting a substantial technical progress of wide industrial applicability, is the possibility by the method according to the invention to recover valuable metals, alloying elements etc. which heretofore have been discarded in such industrial waste waters.

The method according to the invention is described in the following by way of an example from a high-grade steel works producing stainless steel.

The pickling solutions used for the pickling of stainless steel consist of mixtures including substantially nitric acid and hydrofluoric acid. The acid concentration normally is between 10 and 15% nitric acid and 4% hydrofluoric acid.

During the pickling process metallic oxides and metals are dissolved, while forming metal nitrates and metal fluorides, water and nitrous gases (nitric oxides), which in their turn volatilize. Thereby the concentrations of free acids decrease and are restored by the addition of the new acid. The content of metal ions, nitrate ions and fluoride ions in the pickling bath gradually increases, and at a certain content of metal ions the pickling effect is reduced appreciably. The worn-out bath is poured off and replaced by a new pickling solution. The worn-out pickling bath is treated according to the invention by the method steps as follows.

(1) Conversion of the hydrofluoric acid to insoluble calcium fluoride by the addition of equivalent amounts of lime (CaO). This conversion gives rise to a heat development, which is of benefit to the entire reaction process. However, no apparent volume increase (dilution) takes place, as it is the case, for example, when using calcium hydroxide $(CaOH)_2$.

(2) Addition of ammonia until neutralization (pH=7) is achieved, and thereafter in excess (pH=$\geq$8) for the complete formation of metal amines.

(3) Filtering, i.e. separation of the deposit consisting, for example, of iron hydroxides, chromium hydroxides, manganese hydroxides and other compounds of metallic elements, for example, molybdenum and calcium fluoride, from the filtrate, which in addition to $NH_4NO_3$ and $NH_4OH$ substantially contains amino compounds of nickel and to a smaller extent amino compounds of copper and cobalt which are easily soluble. The deposit may be added, for example, to ore concentrates or to oxides and finally be converted to metals.

(4) Addition of alkali hydroxides such as NaOH, KOH and/or hydroxides of the alkaline earth metals, for example $Ca(OH)_2$, but advantageously and in this example KOH, to the filtrate in order thereby to bring about the conditions required for an easy separation of $NH_4OH$ and for the replacement of $NH_4$-ions by K-ions.

(5) Distilling-off the ammonia by water vapour. Ammonia as distillate is returned to the process in step (2) for a new reaction according to the invention.

(6) The hydroxides of the metals nickel, copper and cobalt which were precipitated during the addition of potassium hydroxide and during the distilling-off of ammonia, are separated by filtering from the potassium nitrate solution.

(7) The deposit consisting substantially of nickel hydroxide is dried and annealed. The hydroxide is thereby converted to oxide, which can be introduced directly into the metallurgical process or be converted to metal.

(8) The hydrate consisting of pure potassium nitrate solution is utilized in the production of fertilizers. Hereby the costs of the method according to the invention are reduced considerably, because a full financial compensation is obtained for the potassium used in the method.

The method according to the invention, as it has been described above in the steps (1)–(8), may, of course, be changed, for example as follows.

Instead of the distillation of the ammonia by the injection of water vapour, as suggested in step (5), which results in an increase of the liquid volume and a dilution of the final nitrate solution, air is sucked by vacuum through the amino solution, which is to have a temperature of at least 50° C., but preferably of between 65° C. and 90° C. The ammonia is removed by suction and introduced into a new pickling solution according to step (2), for neutralization with subsequent ammonia addition in excess. In this way the method according to the invention can be carried out continuously and completely without losses, thereby preventing any contamination of the air.

The worn-out pickling baths have still a high acidity, i.e. they still are a heavily attacking liquid which contains metal ions, metal fluorides, fluoride ions and nitrate ions. The chemical properties of these elements allow for an advantageous treatment by using alkaline elements. The acids are thereby neutralized to salts and water while the metals included precipitate as hydroxides difficult to dissolve, and simultaneously alkali hydrates are formed which are soluble. At the routine neutralization of such baths referred to in the introductory portion above, lime is used. Thereby is obtained a metal hydroxide mud, which simultaneously contains calcium fluoride and an aqueous solution of calcium nitrate. This mud can be processed only with great difficulties for making its components available for re-use. (Therefore the mud is stored in waste heaps.) The routine neutralization, moreover, is highly uneconomic, especially because of the high dilution degree required for a complete reaction process.

The calcium nitrate solution is of minor interest as raw material for the fertilizer industry and, therefore, the solution is discharged into lakes and rivers.

When using ammonia, however, according to the invention, the metals are precipitated primarily as hydroxides. By adding according to the invention ammonia in excess in such quantities that the metals nickel, cobalt and copper are converted to their amino compounds, then they are easily soluble. The fluorine content, which per se is disturbing, has been converted to insoluble state by the addition of equivalent lime amounts (equivalent to the fluorine content)—see under step (1). In agreement with the conventional treatment by lime, pickling solutions treated according to the invention contain metal hydroxides difficult to solve. Contrary to the conventional treatment, the metals nickel, copper and cobalt have been converted to their amino compounds easy to solve, which in this state can be recovered in a very simple way. Subsequent to the filtering, therefore, are obtained both the deposit which according to the example contains hydroxides of iron, chromium and manganese, and compounds of other elements, substantially molybdenum, which if desired can be converted to oxides in a known way. The filtrate now includes in addition to the ammonium salts, i.e. ammonium hydrate, also the valuable element nickel and, depending on the chemical analysis of the material pickled, traces of copper and cobalt.

According to the invention, potassium hydroxide is added in such an amount to the filtrate that the desired exchange reaction can take place, i.e. that the ammonium ions are replaced entirely by potassium ions. Thereby ammonia is liberated and can be recovered and returned to the starting step of the process. The invention thereby has rendered possible a high degree of economy and simultaneously prevented the discharge of gas ($NH_3$) into the open air.

Contrary to calcium nitrate as a result of treatment with lime, the potassium nitrate solution obtained by the method according to step 5 above is of an extremely high industrial and economical importance. The object of the invention has been achieved also in this case, viz to prevent waste water, i.e. nitrates, to enter rivers and lakes, as well as a high economy by recovering potassium nitrate and its utilization in the production of fertilizers.

One operation step which is given little attention is the washing of the surfaces of the pickled products. Considerable pickling bath quantities are lost owing to the adhesion of the pickling solution to the products when they are being taken out of the pickling bath. The washing water quantity is so large and the concentration of the pickling solution contained therein so low, that the method according to the invention cannot be applied directly. The washing water usually is discharged into the environment. The high dilution degree, however, is extremely favourable for the application of the known neutralization methods, i.e. by lime.

For recovering the relatively large amounts of metallic elements in the washing water, the following steps according to the invention can be taken. The washing water is neutralized by lime, and the insoluble deposit is filtered off with a certain lime excess and introduced to step 1 above of the method according to the invention. The filtrate, which is alkaline and constitutes an extremely diluted calcim nitrate solution, can now be discharged into the rivers and lakes with a substantially reduced risk of a detrimental effect. This alkaline diluted calcium nitrate solution can in a certain respect be regarded as a counter-weight against the continuous detrimental increase of the acid character of the lakes and rivers.

Further to the above disclosure it may be mentioned that experiments have been carried out to utilize such worn-out pickling solutions for the cleaning of stainless scrap metal, particularly from grinding chips. This is carried out as follows.

(1) The free acids in the pickling solution are consumed.

(2) The metal ion concentration increases in the solution by the solution of oxides.

(3) Oxidation of organic sulphur and carbon, for example form the binding agents of the grinding wheels.

(4) Separation of the metal in the scrap from impurities. The result obtained is a.o.

(1) Purely metallic chips (pure scrap) which can be briquetted and be molten directly.

(2) A solution which high contents of metal ions.

(3) Low consumption of ammonia for the neutralization of the free acids when these baths are treated by the method according to the invention.

It may, finally, be pointed out that the method according to the invention advantageously can be applied in all cases where steps have been taken for increasing the concentration of the metal ions in a pickling bath. This is the case, for example, when applying regeneration processes on the basis of, for example, electrolysis, dialysis or electrodialysis (see, for example, the publications in Ind. Waste Conf. Purdue Univ. May 3–5, 1960, "Dialyses for Acid Recovery," by R. J. Keating). Experiments have proved that the regeneration moment bringing about a longer life of the pickling baths and a more uniform pickling effect, also results in higher concentrations of metal ions and in lower acid contents. This is of importance at the treatment of the worn-out pickling bath by the method according to the invention.

What I claim is:

1. A method of treating industrial waste water, particularly worn-out pickling baths containing $HNO_3$ and $HF$, for the protection of nature, characterized in that it comprises the steps as follows.

(a) Addition of an element adapted to bind insoluble fluoride.

(b) Introduction of ammonia in gaseous state or as ammonium hydroxide up to a pH value of 7.

(c) Introduction of ammonia according to (b), but in excess for the formation of soluble metal amines, i.e. up to a pH value of 8 and higher.

(d) Subsequent to the separation of the insoluble deposit from the solution treated according to steps (a)–(c), addition of alkali hydroxides to the liquid component (filtrate) for substituting the ammonium ions in the ammonium nitrate and in the amines.
(e) Distilling off the ammonia.
(f) Separation of the solid reaction products formed during step (e) from the alkali nitrate solution.

2. Method according to claim 1, characterized in that for the formation of the insoluble fluoride calcium ions are used.

3. Method according to claim 1, characterized in that potassium in the form of potassium hydroxide is used as substitute.

4. Method according to claim 1, characterized in that water vapour is used for distilling off the ammonia.

5. Method according to claim 1, characterized in that for distilling off the ammonia air is used which by vacuum is sucked through the heated solution.

6. A method according to claim 1, characterized in that the pickling solution is used at first for the cleaning of stainless scrap metal, particularly from grinding chips, and that thereafter the method steps according to (a)–(f) of claim 1 are carried out.

7. A method according to claim 1, characterized in that the deposit obtained by the lime treatment of washing water is introduced into the method step (a).

References Cited
UNITED STATES PATENTS
3,097,064   7/1963   Caldwell _____ 23—200 X MICHAEL ROGERS, Primary Examiner U.S. Cl. X.R.
23—88, 200; 75—100; 210—61